(12) United States Patent
Jin

(10) Patent No.: US 6,357,287 B1
(45) Date of Patent: Mar. 19, 2002

(54) SYSTEM AND METHOD FOR DETECTING ENGINE MISFIRE USING FREQUENCY ANALYSIS

(75) Inventor: Jo-Cheol Jin, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/469,953

(22) Filed: Dec. 21, 1999

(30) Foreign Application Priority Data

Jul. 21, 1999 (KR) .............................................. 99-29546

(51) Int. Cl.[7] .............................................. G01M 15/00
(52) U.S. Cl. ...................................................... 73/117.3
(58) Field of Search .............................. 73/116, 117.2, 73/117.3; 701/110, 111; 123/419

(56) References Cited

U.S. PATENT DOCUMENTS

| | | | |
|---|---|---|---|
| 5,200,899 A | * 4/1993 | Ribbens et al. | 701/110 |
| 5,215,059 A | * 6/1993 | Kaneyasu | 123/425 |
| 5,487,008 A | * 1/1996 | Ribbens et al. | 701/110 |
| 5,495,415 A | * 2/1996 | Ribbens et al. | 701/110 |
| 5,576,963 A | * 11/1996 | Ribbens et al. | 701/110 |
| 5,862,507 A | * 1/1999 | Wu et al. | 701/111 |
| 6,006,155 A | * 12/1999 | Wu et al. | 701/111 |
| 6,223,120 B1 | * 4/2001 | Williams | 701/111 |

* cited by examiner

Primary Examiner—G. Dombroske
(74) Attorney, Agent, or Firm—Christie, Parker & Hale, LLP

(57) ABSTRACT

This invention provides a system and method for detecting misfires of an engine that reduces on board computer memory loss and shortens the time to process routines to detect misfires. Teeth are installed in a flywheel connected to a crank shaft, and analog signals that are generated by a difference between a tooth and a bottom of a tooth space are detected by a magnetic pickup. The analog signals are transformed into digital signals by a digital circuit, and the number of HIGH values of the digital signals and time between the top dead centers (TDCs) are detected by a timer and counter. An angular acceleration of the flywheel is then found by an electric control unit (ECU). A magnitude of frequency components of the angular acceleration is found performing a discrete Fourier transform (DFT) on the angular acceleration with respect to a Walsh function as a basis function, and the magnitude of the frequency components are compared with a predetermined reference value to detect a misfire of the engine. When the comparison result exceeds the reference value, an engine misfire is deemed to have occurred.

7 Claims, 11 Drawing Sheets

SYSTEM AND METHOD FOR DETECTING ENGINE MISFIRE USING FREQUENCY ANALYSIS

BACKGROUND OF THE INVENTION (a) Field of the Invention

The present invention relates to a system and method for detecting a misfire occurring in an engine cylinder. More specifically, the present invention relates to a system and method for detecting a misfire occurring in an engine by an electric control unit (ECU).

(b) Description of the Related Art

To prevent air pollution caused by the development of the automotive industry, exhaust gas emissions have been continuously restricted, and accordingly, techniques for electronically controlling engines have been developed. Furthermore, as recent techniques for electronically controlling engines required the adoption of the On-Board Diagnosis 2 (OBD 2) standard that obligates a computer installed in a car to collect information needed to detect malfunctions and to generate alarms, systems and techniques to detect an increase of exhausted gas caused by a misfire and possibility the damage of catalyst are now required. Accordingly, a system and method for detecting an occurrence of a misfire and the engine cylinder at which the misfired occurred, and for restoring the proper operating status of the engine is now desired In a conventional system and method for detecting an engine misfire, when a piston moves back and forth between a top dead center (TDC) and bottom dead center (BDC) positions in a cylinder and a misfire occurs during a power stroke, a rotational period is measured to detect the occurrence of the misfire since the rotation period of a crank shaft increases because of a reduction of torque of the crank shaft. That is, a variation ratio of the revolutions per minute (rpm) of the engine, or of a signal proportional to the rotation period of the engine detected for each predetermined rotational angle of a crank shaft, is computed using the rotation period of the crank shaft, and when this variation ratio exceeds a predetermined reference value, a misfire is deemed to have occurred. In this event, the variation ratio of the rotation period of the engine is indicated as a difference between a presently measured value and a previously measured value, or a difference of the presently measured value and a moving average value. Since this method represents signals of the rotation period of the engine as a function with respect to time, analysis of the variation ratio becomes difficult during high-speed rotations.

To overcome the above-noted problem, systems and methods to analyze the signals of period of the engine not as a function of time, but as magnitudes and phase angles frequency components of discrete Fourier transformations (DFT) have been proposed.

However, to adopt the above systems and methods, previously computed tabulated values of sine and cosine functions must be set and stored in a memory within an engine controlling apparatus, and routines to perform multiplication operations as many times as the values of the data (i.e., the rpm of the engine), to perform a number of multiplication operations according to the size of the signals, and to determine phases are required. Accordingly, the memory of such systems becomes overused and the time to handle such routines increases.

SUMMARY OF THE INVENTION

It is an object of the present invention to provide a system and method for detecting engine misfire while reducing on board computer memory waste and the time to handle calculation routines by using DFT instead of sine and cosine functions.

In one aspect of the present invention, when a misfire occurs in an engine, a frequency analysis is performed on an angular acceleration of the flywheel connected to the crank shaft by DFT, and thereby, the misfire of the engine can be detected by simple addition and subtraction operations.

In more detail, when a misfire occurs in the engine, the angular acceleration that greatly varies because the decrease of output of the engine is detected by a misfire detecting system. In the process of performing a frequency analysis on the angular acceleration of the flywheel, a basis function of the DFT is transformed from a trigonometric function into a Walsh function, and the angular acceleration is sampled between each TDC to find frequency components, and the frequency components are compared with a predetermined reference value so as to determine an occurrence of the misfire.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
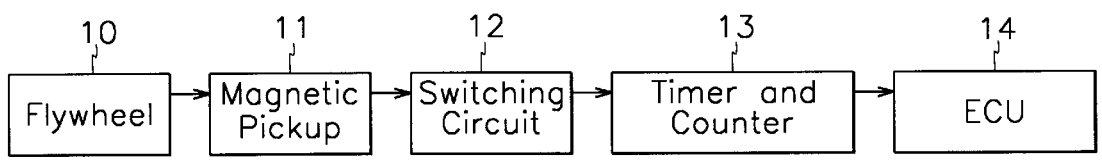
FIG. 1 is a block diagram of a system detecting a misfire of an engine according to a preferred embodiment of the present invention.

FIG. 1 is a block diagram of a system detecting a misfire of an engine according to a preferred embodiment of the present invention. The system comprises a flywheel 10, a magnetic pickup 11, a switching circuit 12, a timer and counter 13, and an electric control unit (ECU) 14.

Referring to FIG. 1, the flywheel 10 is connected to a crank shaft, and teeth are installed to measure an angular acceleration of the crank shaft in the event of an occurrence of a misfire. When the flywheel 10 is rotating, the magnetic pickup 11 detects analog signals which are generated when an magnetic field is changed because of a difference of a distance between a tooth and a bottom of a tooth space.

The switching circuit 12 transforms analog signals detected by the magnetic pickup into digital signals. At this time, since HIGH values of the digital signals are detected when the teeth of the flywheel 10 pass the magnetic pickup 11, a period of the digital signal is defined as a time duration that is from a time when the tooth of the flywheel 10 passes the magnetic pickup and to a time when the next tooth is detected at the magnetic pickup 11.

The timer and counter 13 receives the digital signals transformed by the switching circuit 12 and counts the period of the digital signals and the number of HIGH values. The ECU 14 receives the above-noted data and finds an angular acceleration of the flywheel 10 and performs a frequency analysis on the angular acceleration and compares the magnitude of an amplitude of a frequency with a predetermined reference value so as to determine whether or not a misfire has occurred.

Figure 2:
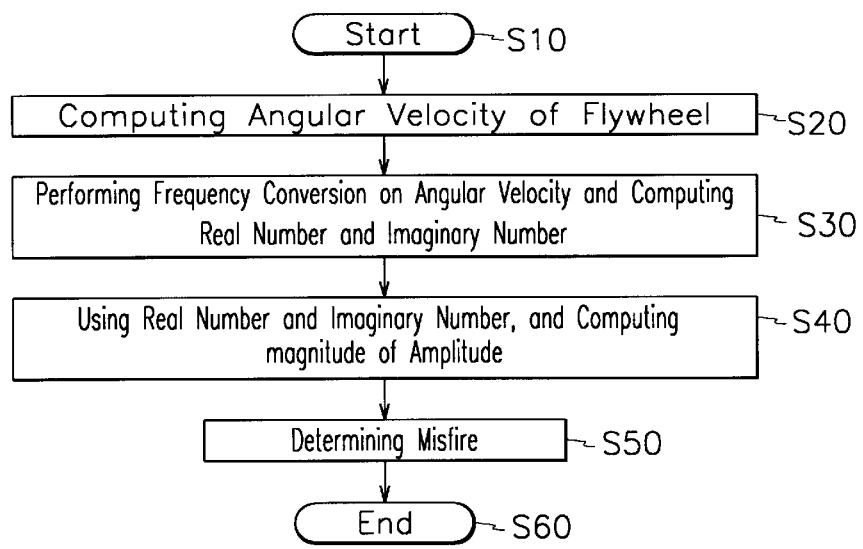
FIG. 2 is a flow chart of a method for detecting a misfire of an engine according to a preferred embodiment of the present invention.

Referring to FIG. 2, a method for detecting a misfire of the engine using the misfire detecting system will now be described.

As shown by FIG. 2, when the ECU 14 starts to detect a misfire of the engine in step s10, the angular acceleration of the flywheel connected to the crank shaft is found in step s20. A frequency analysis on the angular acceleration is performed to find real number RLL and imaginary number IMM parts in step s30, and the magnitude of the amplitude of the frequency component is found using these real number RLL and imaginary number IMM parts in step s40. The magnitude of the amplitude is then compared with a predetermined reference value to determine if there has been an occurrence of a misfire in step s50, and the method is then terminated in step s60.

When the ECU 14 starts detecting an occurrence of an engine misfire in step s10, the angular acceleration is found using the teeth installed in the flywheel 10 in step s20. Since the flywheel 10 is connected to the crank shaft, the angular acceleration of the crank shaft caused by the misfire can be found.

To find the angular acceleration of the flywheel 10, the magnetic pickup 11 detects the analog signals which are generated when a magnetic field is changed because of a difference of a distance between a tooth and a bottom of a tooth space. The switching circuit 12 transforms the analog signals into the digital signals.

Since the period of the digital signal is a time from when the tooth installed on the flywheel 10 passes the magnetic pickup 11 until the next tooth appears at the magnetic pickup, the angular acceleration of the crank shaft can be found when the number of HIGH values and the period of these digital signals are measured at the timer and counter 13. The ECU 14 receives these data and finds the angular acceleration. When the angular acceleration of the flywheel is found in step s20, a discrete Fourier transformation (DFT) with a basis function of a Walsh function is performed on the angular acceleration signals. The real number and imaginary number parts of this transformation are computed in step s30, and the magnitude of the amplitude is computed in step s40 using the real and imaginary numbers. Since the magnitude of the amplitude increases in the event of an occurrence of a misfire, the magnitude of the amplitude can be compared with a predetermined reference value. If the magnitude of the amplitude is greater than the reference value, it is determined to be a misfire in step s50, and the detection of the misfire is then terminated in step s60.

In more detail, a method for detecting a misfire of the engine will now be described according to a preferred embodiment of the present invention.

To find the angular acceleration of the flywheel 10 that greatly changes because of a power decrease in the event of an occurrence of a misfire, a general equation of the angular acceleration must be derived using the angular velocity found by the Equation 1, $$\omega = \frac{2\pi}{T} \qquad \text{Equation 1}$$

where, T represents a period of one cycle of the flywheel.

Referring to Equation 1, it is clear that the period T first must be measured to find the angular velocity ω. The method for detecting an engine misfire detects if a power stroke did not occur when a piston reached the TDC of a cylinder. Therefore, to find the period T, a time duration between two TDCs must be measured first. This is a time duration from a point when a piston reaches one TDC in a power stroke to a point when a piston reaches another TDC in a next power stroke. The time between the two TDCs can be measured by the timer and counter 13 using the digital signals output from the switching circuit 12. When the number of the teeth of on a flywheel is assigned to be the value of two in a four-cylinder engine, the time between two TDCs is identical to the period of the digital signals detected by the switching circuit 12 of FIG. 1. This is because the interval between TDCs occurs four times every one cycle of the engine, and the flywheel 10 connected to the crank shaft rotates twice every one cycle of a four stroke four-cylinder engine. Therefore the flywheel connected to the crank shaft rotates one half time during the interval between the two TDCs.

Hence, when the teeth are installed 180° apart (i.e., on a diameter of the flywheel 10), four HIGH values of the digital signals generated by the magnetic pickup 11 and the switching circuit 12 occur every one cycle in which the four cylinders respectively perform a power stroke. Therefore, the period of the digital signal becomes the time for each interval between the TDCs.

To find the angular acceleration, this time must be multiplied by two in order to represent the period of one complete rotation of the flywheel and a doubled time of the interval between the TDCs (which will be referred to simply as the "doubled time" hereafter) is calculated in order to determine the period.

Therefore, the angular velocity of the flywheel 10 during an $i^{th}$ doubled time can be expressed as follows:

$$\omega_i = \frac{2\pi}{T_i} \qquad \text{Equation 2}$$

where, $T_i$ represents an $i^{th}$ doubled time.

When the $i^{th}$ angular velocity is represented as Equation 2, then in order to find the angular acceleration of the flywheel 10, the timer and counter 13 detect the period of the digital signals output from the switching circuit 12, and the ECU 14 determines the angular acceleration of the flywheel 10 by the following Equation 3:

$$\Delta\omega = \frac{2\pi}{T_i} - \frac{2\pi}{T_{i-1}} \qquad \text{Equation 3}$$

$$\Delta T = \frac{T_i + T_{i-1}}{2}$$

$$\alpha_i = \frac{\Delta\omega}{\Delta T} = \frac{4 \cdot \pi \cdot (T_{i-1} - T_i)}{T_i \cdot T_{i-1} \cdot (T_i + T_{i-1})}$$

where, $\Delta\omega$ is a variation of the angular velocity, $T_i$ is the $i^{th}$ doubled time, $\Delta T$ is a variation of the doubled time, and $\alpha_i$ is the $i^{th}$ angular acceleration.

After the angular acceleration of the flywheel 10 is found by the Equation 3 in step s20, the angular acceleration is analyzed with respect to frequency components, and its real number RLL and imaginary number IMM parts are found.

To analyze the angular acceleration with respect to its frequency components, a DFT is performed on the angular acceleration of the flywheel 10 as shown in Equation 4:

$$A[k] = \sum_{n=1}^{N} \alpha[n] e^{-j\left(\frac{2\pi}{N}kn\right)} \qquad \text{Equation 4}$$

$$= \sum_{n=1}^{N} \alpha[n] \left[ \cos\left(\frac{2\pi}{N}kn\right) - j\sin\left(\frac{2\pi}{N}kn\right) \right]$$

where, $A[k]$ is a coefficient of the DFT corresponding to the kth higher harmonic, N is the number of angular acceleration signals sampled with identical intervals with respect to the angular acceleration signal $\alpha$, and $\alpha[n]$ is an $n^{th}$ sampled angular acceleration signal of the angular acceleration signals.

Since a four-cylinder engine has four power strokes for each engine cycle, four doubled times are measured, and accordingly four angular accelerations are detected, so the frequency of this signal is said to be four per cycle. At this time, when a misfire occurs in a cylinder, the absolute magnitude of the angular acceleration at that instant increases, and therefore, the misfire component of the cycle becomes a dominant component of the angular acceleration signal $\alpha$, and the frequency per cycle approaches one. Hence, Equation 4 can be expressed as Equation 5.

$$A[1] = \sum_{n=1}^{N} \alpha[n] \left[ \cos\left(\frac{2\pi}{N}n\right) - j\sin\left(\frac{2\pi}{N}n\right) \right] \qquad \text{Equation 5}$$

To compute Equation 5, a previously computed table for sine and cosine functions must be set and stored in the memory of the ECU 14, and routines to perform multiplication operations as many times as the number of the data elements, and to perform multiplication on the size of the signals, and to determine phases are required. Accordingly, memory can be overused and the time to handle these routines increases.

Therefore, the embodiment of the present invention uses not trigonometric function, but a Walsh function as the basis function of the DFT. As shown by the two graphs of FIG. 3(b), during a period from zero to $2\pi$ of the t axis for the Walsh function, the positive portions of the sine and cosine functions are indicated as '1,' and the negative portions of the sine and cosine functions are indicated as '−1.'

Figure 3A:
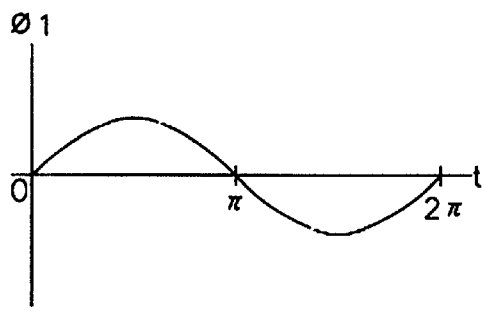
FIG. 3(a) show graphs of sine and cosine functions.
Figure 3A:
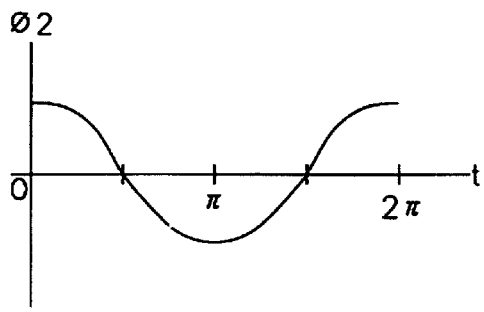
Figure 3B:
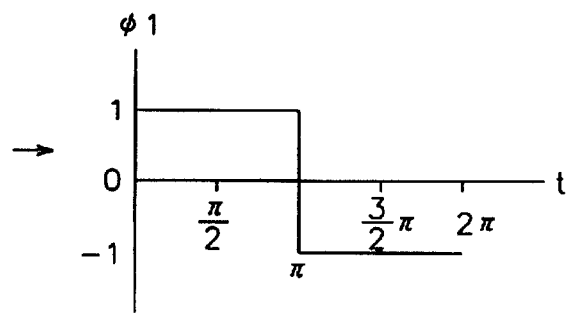
FIG. 3(b) show graphs of Walsh functions of sine and cosine functions.
Figure 3B:
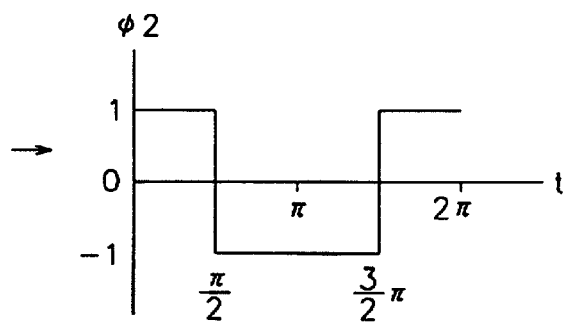

In order for the Walsh function as shown in FIG. 3(b) to be the basis function of the DFT, an inter-Walsh function orthogonality is needed in a limited space, a requirement which can be expressed by Equation 6:

$$\int_1^2 \Psi_n(t)\Psi_m(t)dt = \lambda_n(n = m) \qquad \text{Equation 6}$$

$$= 0 (n \neq m).$$

Referring to Equation 7, it can be proved that a Walsh function can be basis function of the DFT according to the requirement of Equation 6:

$$\int_0^{2\pi} \Psi_1 \Psi_2 dt = \int_0^{\pi/2}(1)\cdot(1)dt + \int_{\pi/2}^{\pi}(1)\cdot(-1)dt + \qquad \text{Equation 7}$$

$$\int_{\pi}^{3\pi/2}(-1)\cdot(-1)dt + \int_{\pi/2}^{\pi}(-1)\cdot(1)dt$$

$$= 0$$

$$\int_0^{2\pi} \Psi_1 \Psi_1 dt = \int_0^{\pi/2}(1)\cdot(1)dt + \int_{\pi/2}^{\pi}(1)\cdot(1)dt +$$

$$\int_{\pi}^{3\pi/2}(-1)\cdot(-1)dt + \int_{\pi/2}^{\pi}(-1)\cdot(-1)dt$$

$$= 2\pi$$

$$\int_0^{2\pi} \Psi_2 \Psi_{21} dt = \int_0^{\pi/2}(1)\cdot(1)dt + \int_{\pi/2}^{\pi}(-1)\cdot(-1)dt +$$

$$\int_{\pi}^{3\pi/2}(-1)\cdot(-1)dt + \int_{\pi/2}^{\pi}(1)\cdot(1)dt$$

$$= 2\pi,$$

where, $\Psi 1$ is the Walsh function with respect to sine function, and $\Psi 2$ is the Walsh function with respect to cosine function.

Therefore, orthogonality is satisfied between the Walsh functions. On using the Walsh function as the basis function on the DFT, Equation 5 is then simplified into Equation 8:

$$A[1] = \sum_{n=1}^{N} \alpha[n] \left[ WAL_{\cos}\left(\frac{2\pi}{N}n\right) - jWAL_{\sin}\left(\frac{2\pi}{N}n\right) \right]. \qquad \text{Equation 8}$$

Since the value of the Walsh function either is '1' or '−1,' all addition terms of the above equation can be simplified by addition or subtraction. Since four time TDC intervals exist in the four-cylinder engine during one cycle of the engine and each angular acceleration is computed for each doubled time, the number N of samplings becomes four.

Therefore, when Equation 8 is adjusted into real number and imaginary number parts, Equation 9 is obtained:

$$RLL = \alpha[1] - \alpha[2] - \alpha[3] + \alpha[4] \quad \text{Equation 9}$$
$$= \alpha_i - \alpha_{i+1} - \alpha_{i+2} + \alpha_{i+3}$$
$$IMM = \alpha[1] + \alpha[2] - \alpha[3] - \alpha[4]$$
$$= \alpha_i + \alpha_{i+1} - \alpha_{i+2} - \alpha_{i+3}$$

where, RLL is a real number part of Equation 8, IMM is a imaginary number part of Equation 8, α[n] is an $n^{th}$ sampled angular acceleration, and $\alpha_i$ is the angular acceleration of an $i^{th}$ doubled time.

After finding the angular acceleration of the flywheel 10 using the RLL and IMM in step s30, the magnitude SQRDFT (defined as the sum of the squares of the real number and imaginary number parts in Equation 10 below) of the amplitude of the frequency component is found in step s40. At this time, when a misfire occurs, the absolute magnitude of the angular acceleration increases, and therefore, when performing a frequency analysis of the angular acceleration, the frequency component's amplitude magnitude expands or becomes larger. Hence, the SQRDFT is compared with a predetermined reference value to determine the occurrence of the misfire in step s50.

Since the magnitude of the amplitude of the frequency component is a summation of the squares of the RLL and IMM parts of the frequency component, the SQRDFT value can be expressed as Equation 10:

$$SQRDFT = RLL^2 + IMM^2 \quad \text{Equation 10}$$
$$= (\alpha_i - \alpha_{i+1} - \alpha_{i+2} + \alpha_{i+3})^2 +$$
$$(\alpha_i + \alpha_{i+1} - \alpha_{i+2} - \alpha_{i+3})^2.$$

When the determination of the occurrence of the misfire occurs in step s50, the detection process of the misfire is then terminated in step s60. A process of detecting the misfire shown in FIG. 2 can be performed by directly programming Equation 10 without performing step s30.

FIGS. 4 through 12 show results of detection of the misfire under various conditions using the preferred embodiment of the present invention.

FIGS. 4 through 7 represent variations of the SQRDFT in the event that a misfire occurs in one or two cylinders for predetermined TDC intervals in an idling engine.

Figure 4:
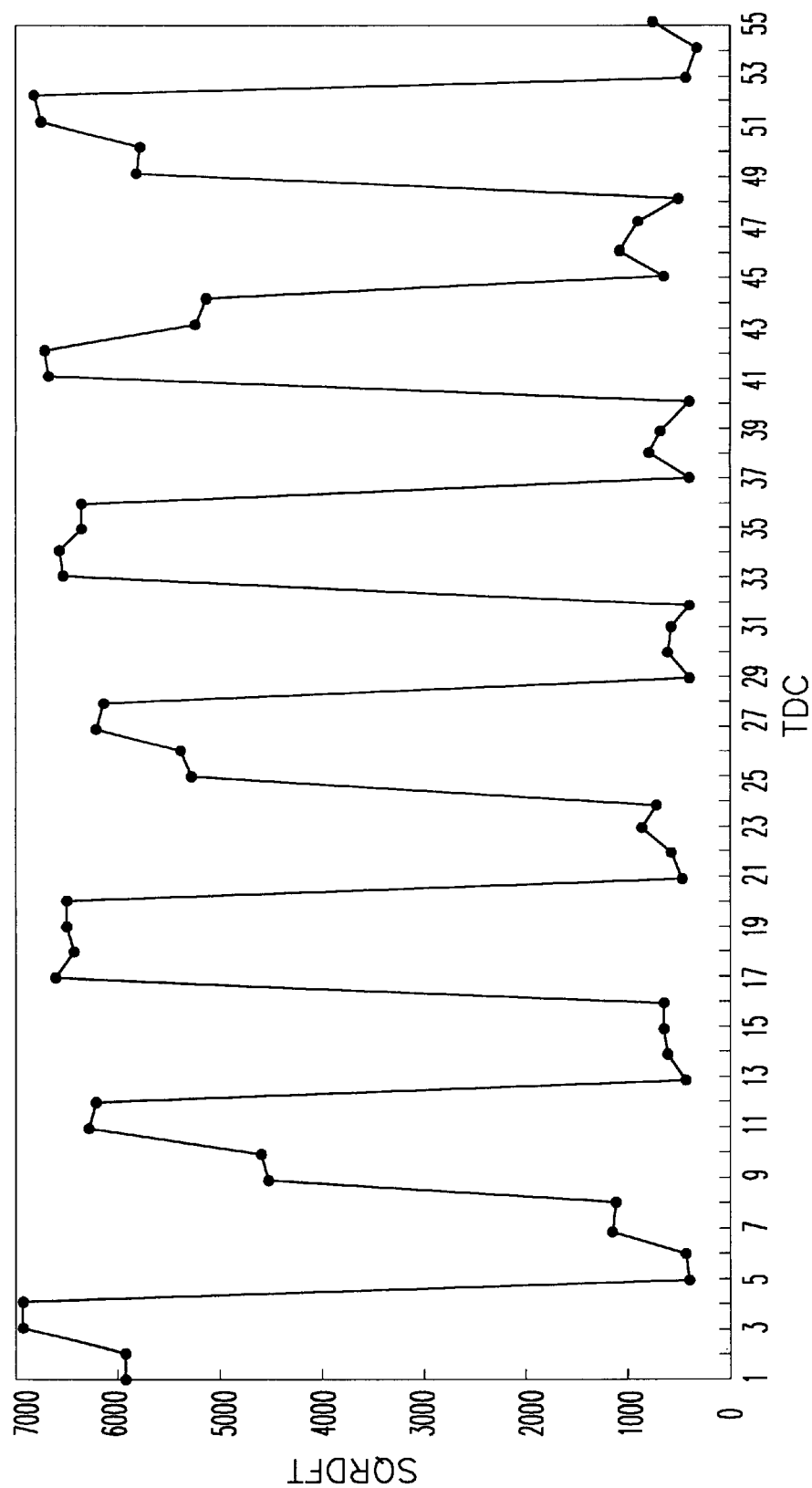
FIG. 4 is a diagram of a variation of the values of a SQRDFT function in the event that a misfire occurs once every eight TDC intervals in a cylinder while idling.

FIG. 4 depicts a variation of the SQRDFT that occurs when a misfire is generated at an interval of once every eight TDCs. In this case, when a predetermined reference value to determine the misfire has been set at a value of 4000, SQRDFT values over this reference value occur consecutively for four TDC times. For example, when power strokes occur in a four-cylinder engine in the first, third, fourth, and then second cylinders, if a misfire occurs in the first cylinder once, the absolute value of the magnitude of the angular acceleration αi of the flywheel 10 takes on a great value. The other cylinders in this case are assumed to have performed normal power strokes so therefore, $\alpha_{i+1}$ through $\alpha_{i+3}$ take on relatively smaller values. Accordingly, the angular accelerations that form the SQRDFT value which first exceeds the reference value are $\alpha_{i-3}$, $\alpha_{i-2}$, $\alpha_{i-1}$, and $\alpha_i$, and the angular accelerations that forms the SQRDFT value which exceeds the reference value the fourth time are $\alpha_i$, $\alpha_{I+1}$, $\alpha_{I+2}$, and $\alpha_{I+3}$. The angular accelerations that form the SQRDFT value at the next following TDC interval becomes small since Equation 10 does not include an angular acceleration caused by the misfire. Therefore, it can be seen that when one misfire occurs in one cylinder, the SQRDFT continuously exceeds the reference value four times.

Figure 5:
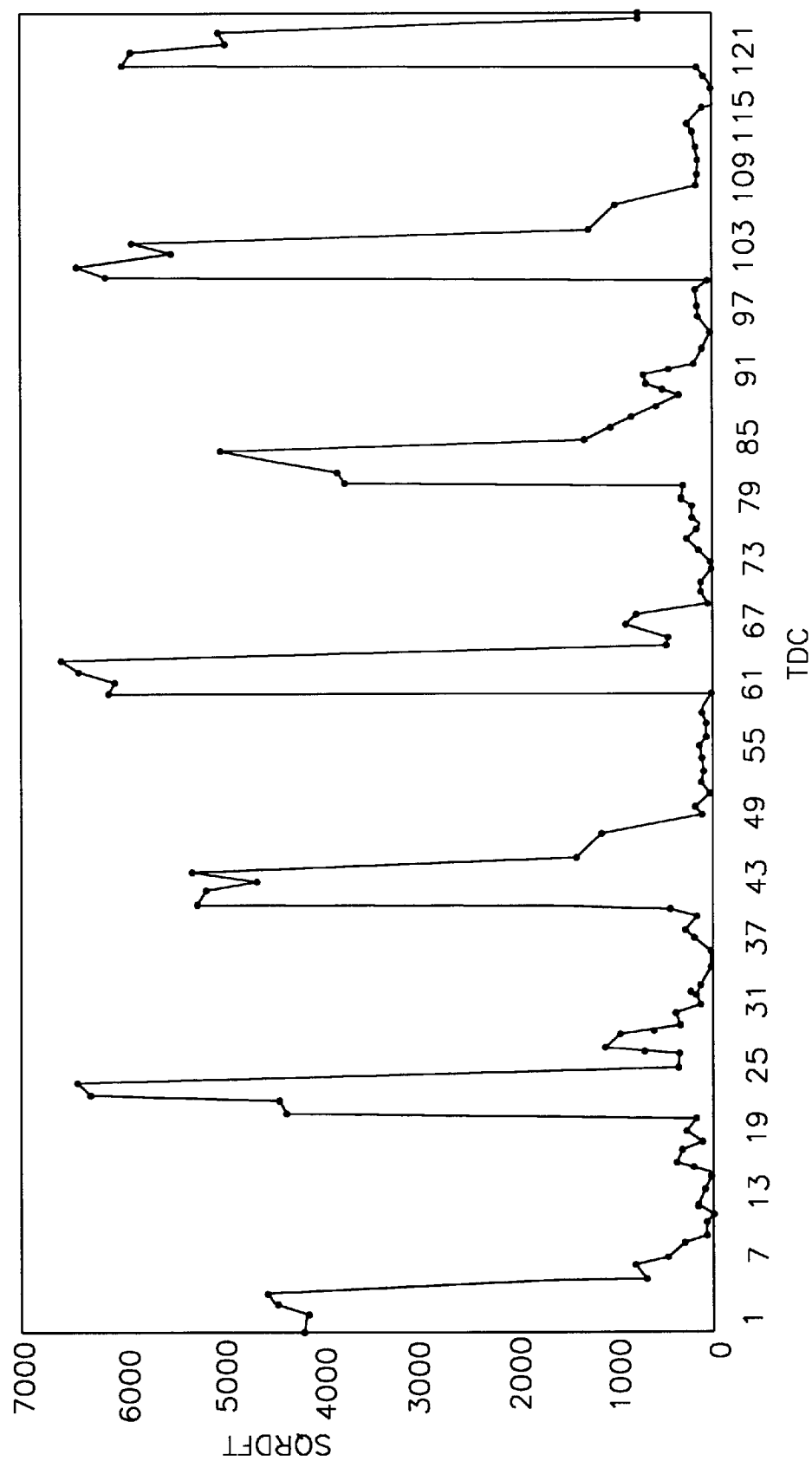
FIG. 5 is a diagram of a variation of the values of a SQRDFT function in the event that a misfire occurs once every twenty TDC intervals in a cylinder while idling.

FIG. 5 depicts a variation of the value of SQRDFT that occurs when a misfire is generated at an interval of once per every twenty TDCs in one cylinder. As explained referring to FIG. 4, the SQRDFT continuously exceeds the reference value for four times, and the following SQRDFT values do not reach the reference value. Therefore, when the SQRDFT value continuously exceeds the reference value for four TDC intervals, the ECU 14 determines that a misfire has occurred in one cylinder.

Figure 6:
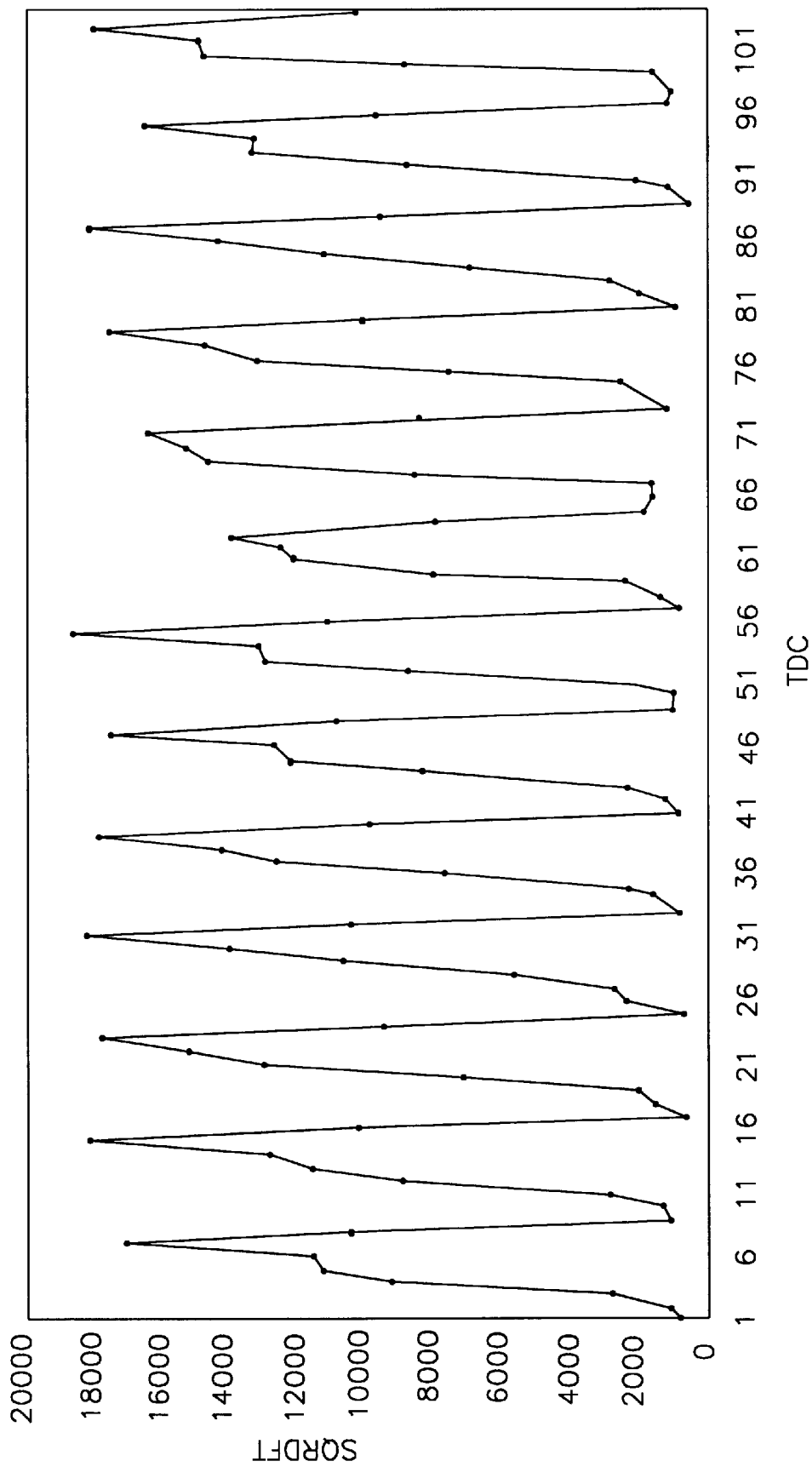
FIG. 6 is a diagram of a variation of the values of a SQRDFT function in the event that a misfire occurs once every eight TDC intervals in the first and third cylinders while idling.

FIG. 6 depicts a variation of the SQRDFT that occurs when each misfire is generated once every eight TDC intervals in the first and third cylinders. When a predetermined reference value to determine the misfire is set with the value of 4000, the values over the reference value continuously occur for five TDC intervals. For example, when the power strokes occur in the four-cylinder engine in the first, third, fourth, and then the second cylinder, if a misfire occurs in the first cylinder once and another misfire occurs in the third cylinder during the next TDC interval, followed by the normal operation of the engine, the angular accelerations $\alpha_i$ and $\alpha_{i+1}$ of the flywheel 10 take on large values. Since the other cylinders perform normal power strokes, normal angular acceleration values occur after $\alpha_{i+3}$. Therefore, the angular accelerations that first form the SQRDFT value that exceeds the reference value are $\alpha_{i-3}$, $\alpha_{i-2}$, $\alpha_{i-1}$, and $\alpha_i$, and the angular accelerations that form the SQRDFT that exceeds the reference value for the fifth time are $\alpha_{I+1}$, $\alpha_{I+2}$, $\alpha_{I+3}$, and $\alpha_{I-4}$. Starting from the sixth SQRDFT value, the angular accelerations that form the SQRDFT values have smaller magnitudes since they do not include the angular acceleration components a and $\alpha_i$ and $\alpha_{i+1}$. Therefore, when one misfire occurs in neighboring cylinders (e.g., the first and third cylinders or the fourth and second cylinders), the value of SQRDFT continuously exceeds the IS reference value for five TDC intervals. Therefore, the ECU 14 can determine that misfires have occurred in respective neighboring cylinders.

Figure 7:
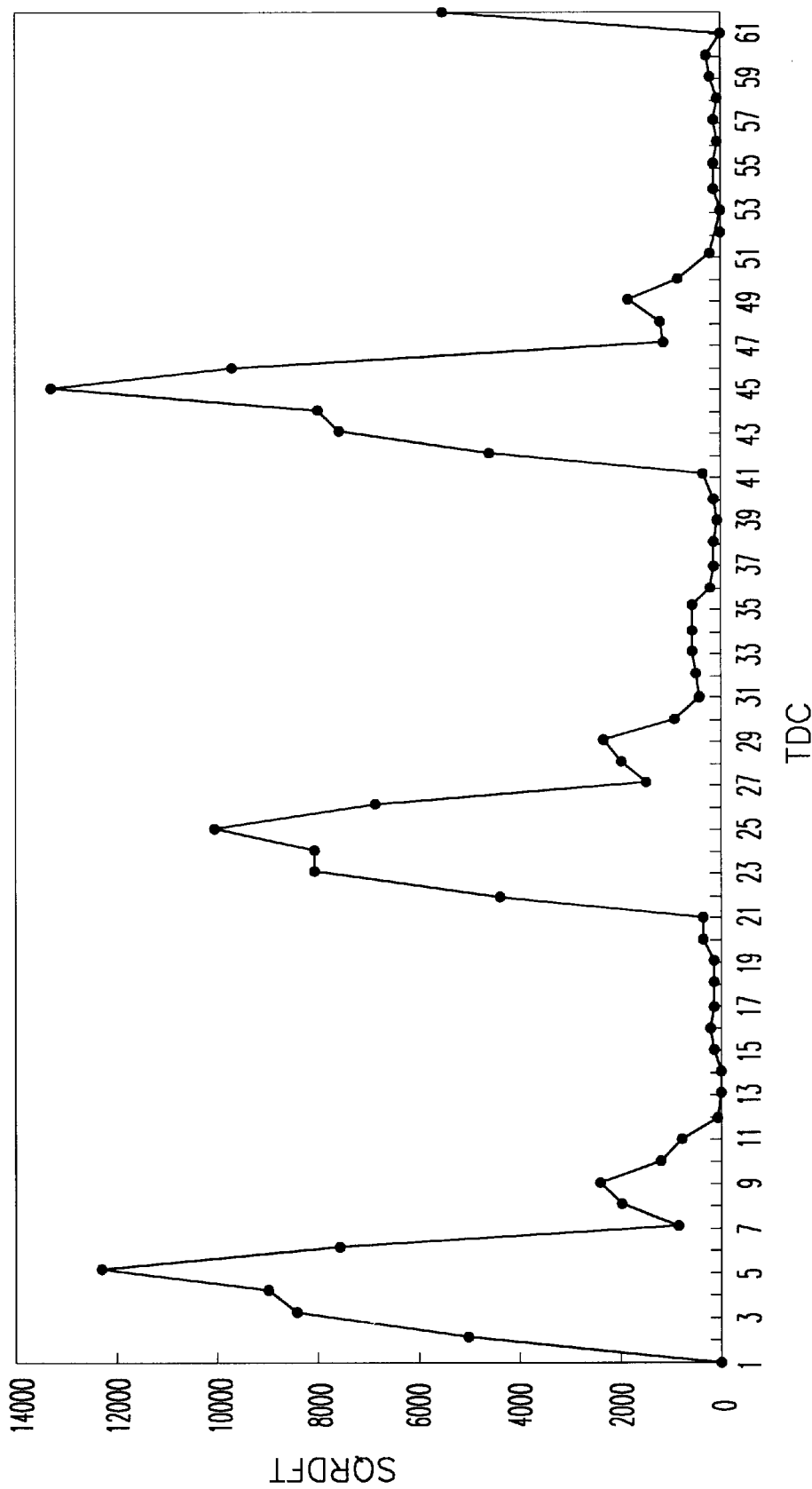
FIG. 7 is a diagram of a variation of the values of a SQRDFT function in the event that a misfire occurs once every twenty TDC intervals in the first and third cylinders while idling.

FIG. 7 depicts a variation of the values of SQRDFT that occurs when each misfire is generated once every twenty TDC intervals in the first and third cylinders. The values of the SQRDFT over the reference value occur continuously for five TDC intervals, and after that, the SQRDFT show values less than that of the reference value, leading to the same results of FIG. 6.

Figure 8:
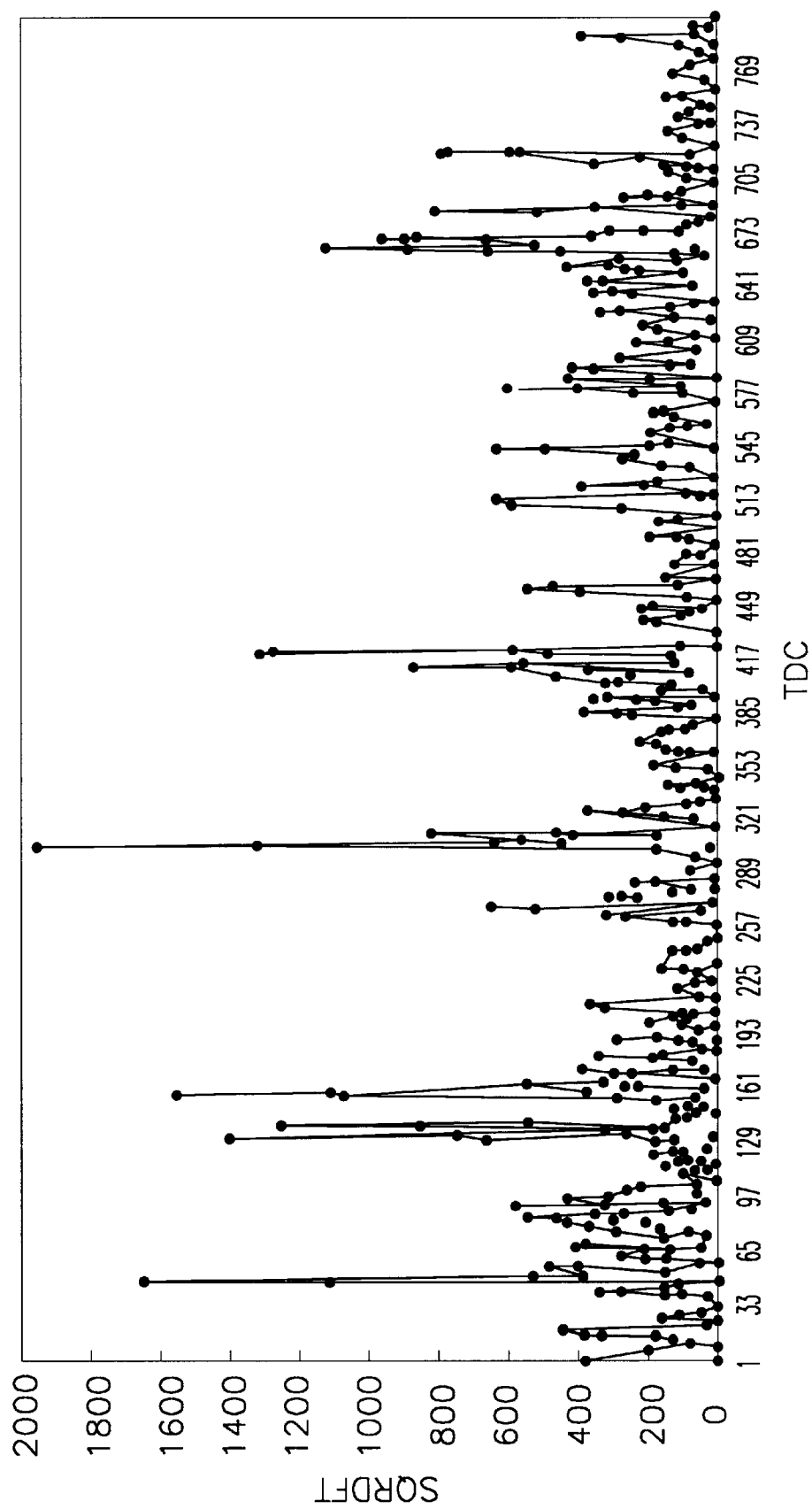
FIG. 8 is a diagram of a variation of the values of a SQRDFT function in the event of a gentle working of the accelerator without a misfire during a driving mode.
Figure 9:
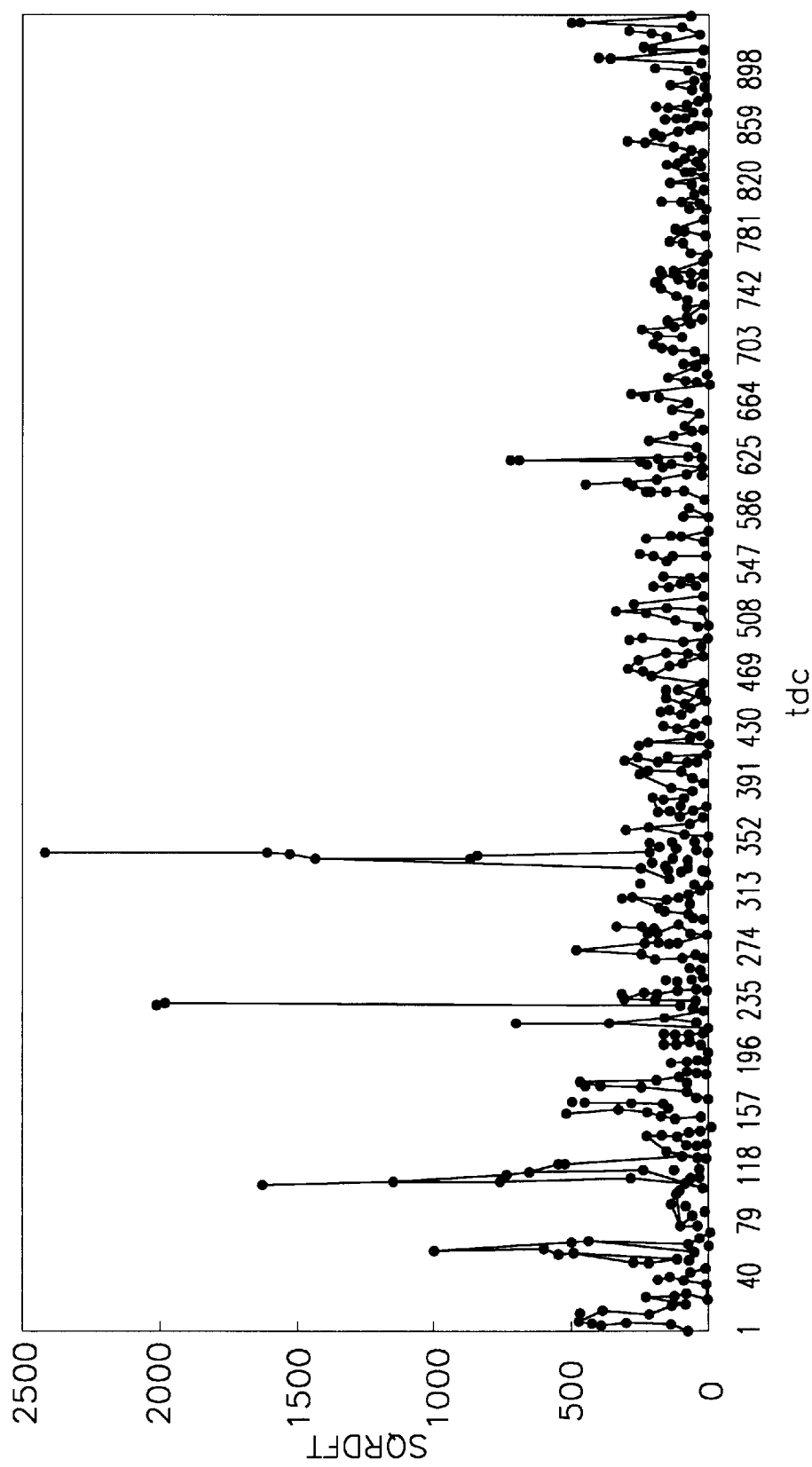
FIG. 9 is a diagram of a variation of the values of a SQRDFT function in the event of an operation of an electric load without a misfire during a driving mode.
Figure 10:
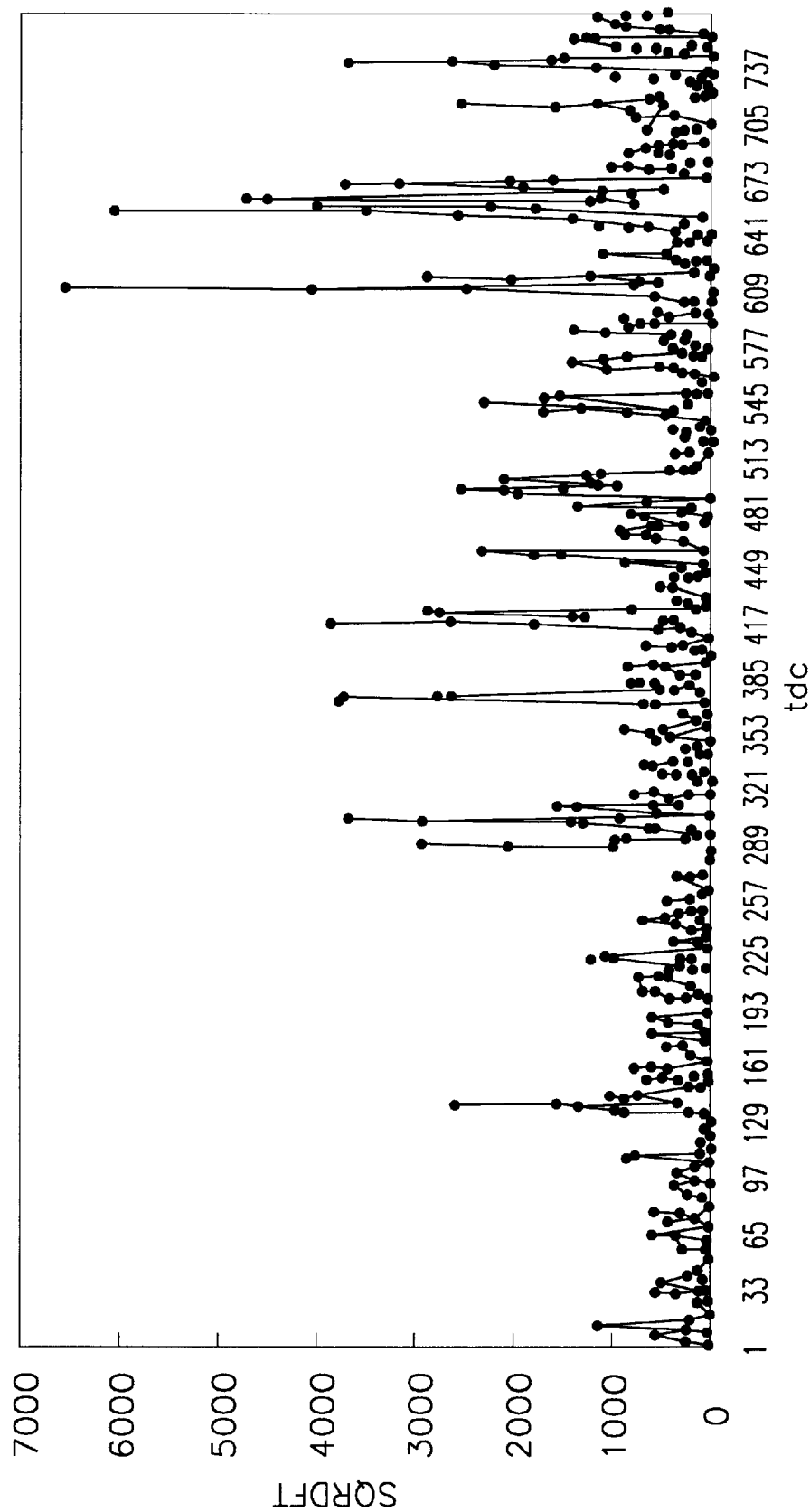
FIG. 10 is a diagram of a variation of the values of a SQRDFT function in the event of an operation of the power steering system without a misfire during a driving mode.

FIGS. 8 through 10 depict variations of the SQRDFT while driving without a misfire.

FIG. 8 depicts a variation of the SQRDFT when a driver gradually steps on an accelerator. FIG. 9 depicts a variation of the SQRDFT when operating an electric load. In this case, since a misfire does not occur the SQRDFT value continues to be smaller than the predetermined reference value.

Referring to FIG. 10, when the power steering system operates, the SQRDFT values are relatively low, even though there are occasionally high SQRDFT values, the occurrence of the misfires can still be detected. Therefore, since the SQRDFT values are continuously lower than the reference value when driving without any misfires, the ECU 14 therefore can determine that no misfire have occurred.

Figure 11:
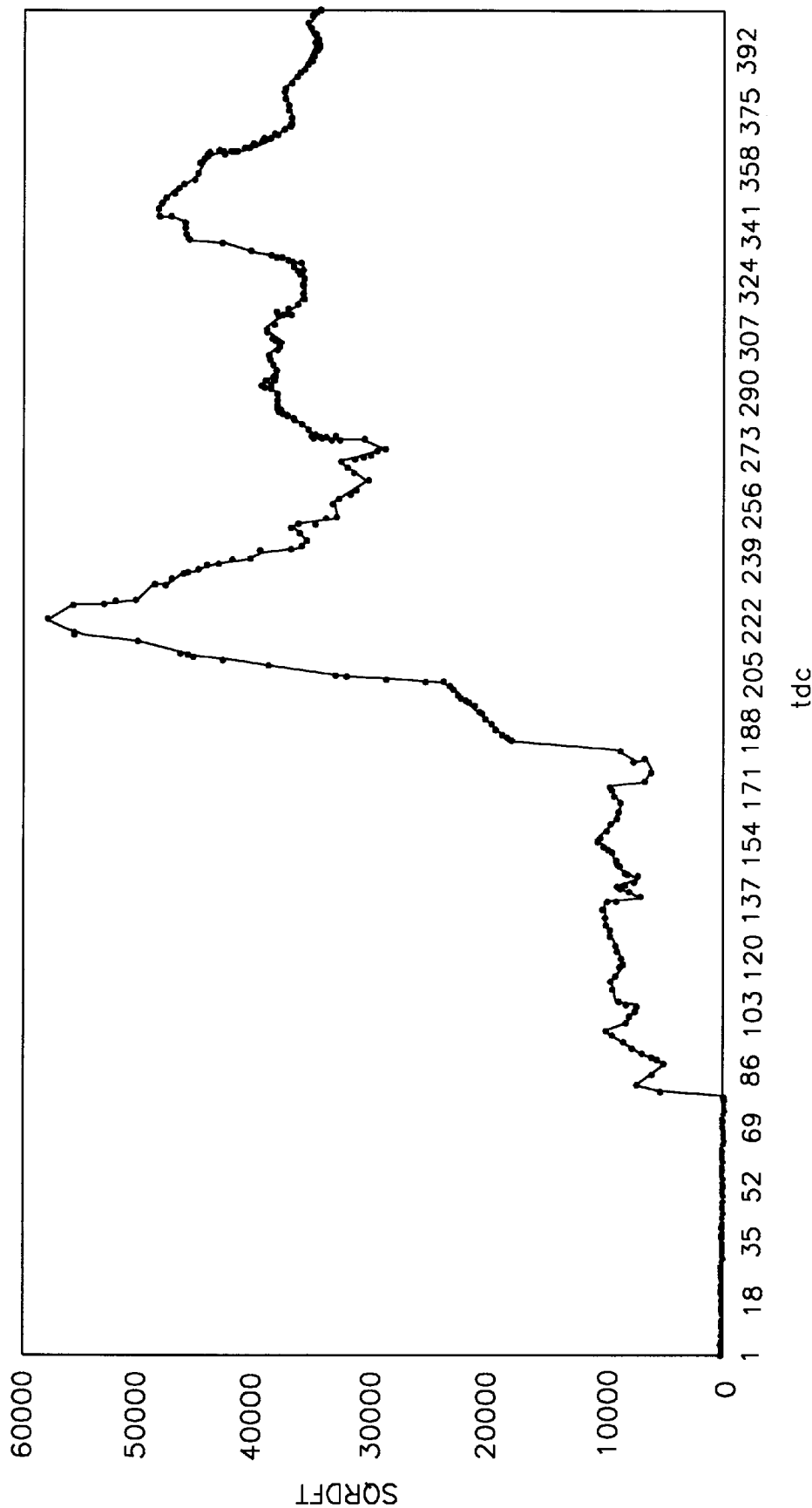
FIG. 11 is a diagram of a variation of the values of a SQRDFT function in the event that fuel injection is prohibited in the first and third cylinders.
Figure 12:
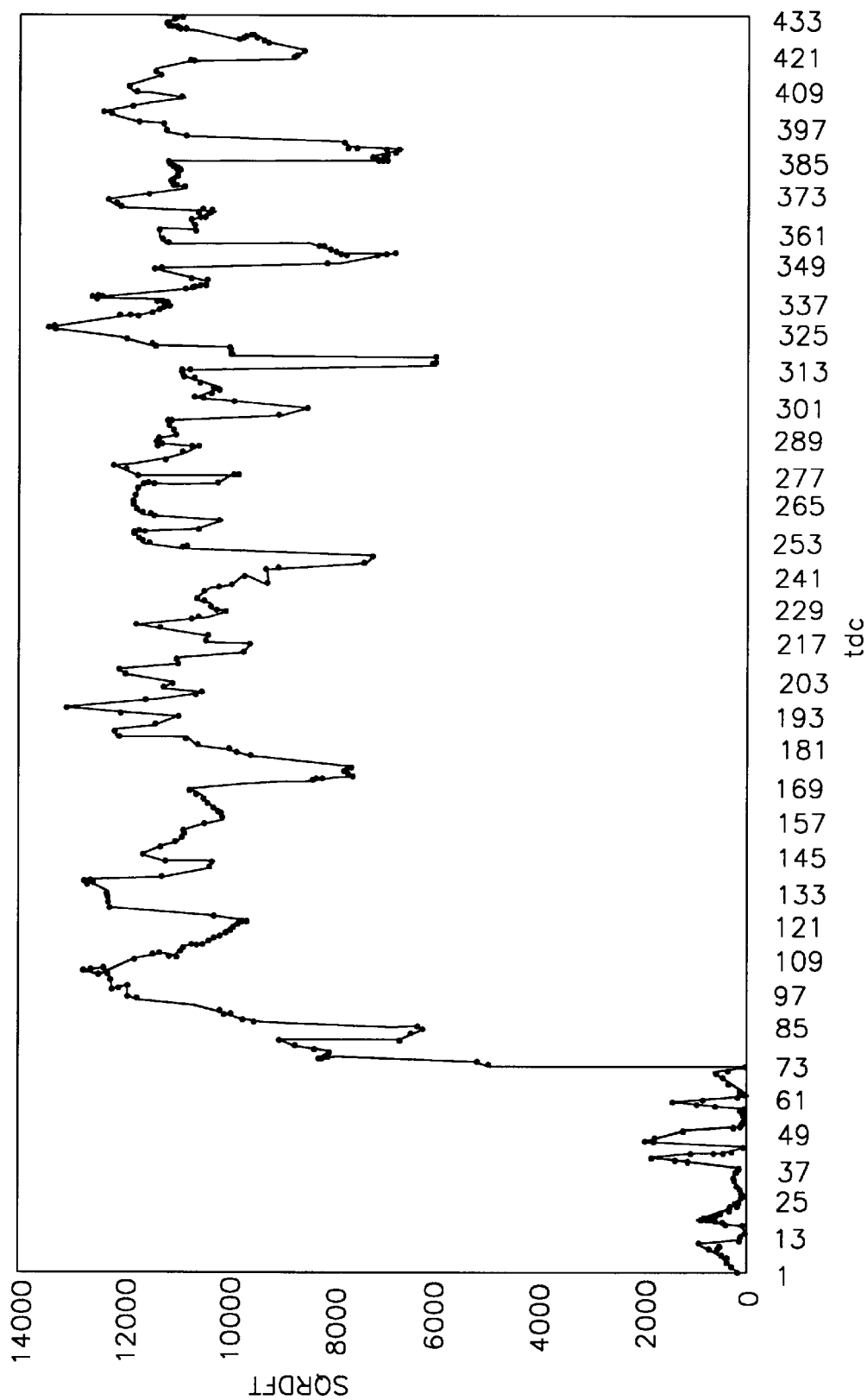
FIG. 12 is a diagram of a variation of the values of a SQRDFT function in the event that fuel injection is prohibited in the first cylinder.

FIGS. 11 and 12 depict variations of the values of SQRDFTs when there is a continuous occurrence of misfires. FIG. 11 shows a case when the misfires continuously occur in the first and third cylinders. FIG. 12 shows a case when the misfires continuously occur in only the first cylinder. Because of the continuous occurrences of the misfires, the magnitude of the angular acceleration continues to be great, so the SQRDFT values are always high.

As noted above, since the angular accelerations are found for each TDC interval using Equation 10, the misfires can be simply determined by addition and subtraction operations.

The present invention reduces software implementations in the ECU by utilizing a simple detection method to determine the occurrence of the misfires, and it improves combustion efficiency that leads to complete combustion and a decrease in the discharge of polluting materials.

While this invention has been described in connection with what is presently considered to be the most practical and preferred embodiment, it is to be understood that the invention is not limited to the disclosed embodiments. On the contrary, it is intended to cover various modifications and equivalent arrangements included within the spirit and scope of the appended claims.

What is claimed is:

1. A system for detecting a misfire of an engine, comprising:

a flywheel connected to a crank shaft and having teeth;

a magnetic pickup generating analog signals according to variations of a magnetic field caused by a difference of a distance between a tooth and a bottom of a tooth space on the flywheel;

a switching circuit receiving the analog signals and outputting digital signals;

a timer and counter detecting a period of the digital signals and a number of HIGH values;

an electric control unit (ECU) receiving the period of the digital signals and the number of the HIGH values to detect the misfires of the engine, wherein the ECU receives the period of the digital signals and the number of the HIGH values detected from the timer and counter, and finds an angular acceleration of the flywheel, and performs frequency analysis on the angular acceleration based on a Walsh function as a basis function so as to find a magnitude of an amplitude of frequency components, and compares the magnitude of the amplitude with a predetermined reference value so as to determine an occurrence of a misfire.

2. The system of claim 1, whereon the flywheel comprises two teeth thereby making the period of the digital signal identical with a time between top dead centers (TDCs), wherein the time between the TDCs is defined as a time duration from a time when a piston reaches a TDC of a cylinder to perform a power stroke to a time when a piston that generates the next power stroke reaches TDC.

3. The system of claim 1, wherein the timer and counter detects a HIGH value and a next HIGH value of the digital signals using the counter, and computes a time between the two HIGH values using the timer.

4. A method for detecting a misfire of an engine, comprising the steps of:

finding an angular acceleration of a flywheel;

performing a frequency analysis on the angular acceleration using a Walsh function as a basis function, and finding real number and imaginary number parts;

finding a magnitude of an amplitude of frequency components using the real number and imaginary number parts; and comparing the magnitude of the amplitude of the frequency components with a predetermined reference value to determine an occurrence of the misfire.

5. The method of claim 4, wherein in order to perform the frequency analysis on the angular acceleration of the flywheel connected to a crank shaft, a basis function of a discrete Fourier transform (DFT) is transformed from a trigonometric function to a Walsh function.

6. The method of claim 4, wherein in order to perform the frequency analysis on the angular acceleration, the frequency of the angular acceleration signal caused by the misfire is set as one.

7. The method of claim 4, wherein in order to perform the frequency analysis on the angular acceleration, the angular acceleration signals are sampled during each doubled time of the interval between the TDCs per one cycle of the engine.

* * * * *